United States Patent [19]
Ozawa et al.

[11] Patent Number: 5,533,113
[45] Date of Patent: Jul. 2, 1996

[54] AUTOMATIC POSITION MANAGING SYSTEM

[75] Inventors: Masayuki Ozawa; Takashi Gounji; Kenji Morosawa, all of Kawasaki, Japan

[73] Assignee: Fujitsu Limited, Kawasaki, Japan

[21] Appl. No.: 969,738

[22] Filed: Oct. 30, 1992

[30] Foreign Application Priority Data

Nov. 7, 1991 [JP] Japan ................................. 3-291388

[51] Int. Cl.⁶ ............................ H04M 3/42; H04M 11/00
[52] U.S. Cl. ............................ 379/211; 379/58; 379/59; 379/201
[58] Field of Search ........................... 379/57, 58, 59, 379/60, 201, 210, 211, 212, 207

[56] References Cited

U.S. PATENT DOCUMENTS

| | | | |
|---|---|---|---|
| 4,649,385 | 3/1987 | Aires et al. | 379/210 X |
| 4,658,416 | 4/1987 | Tanaka | 379/211 X |
| 4,782,517 | 11/1988 | Bernardis et al. | 379/269 X |

FOREIGN PATENT DOCUMENTS

| | | | |
|---|---|---|---|
| 62-237855 | 10/1987 | Japan | 379/211 |
| 1-232865 | 9/1989 | Japan | 379/211 |

*Primary Examiner*—Jeffery A. Hofsass
*Assistant Examiner*—Harry S. Hong
*Attorney, Agent, or Firm*—Staas & Halsey

[57] ABSTRACT

An automatic position managing system is applied to a communication system which includes a plurality of telephone sets coupled to a private branch exchange. The automatic position managing system uses a radio card which is carried by a user and has the functions of storing information related to the user and transmitting the stored information by a radio signal. A first part supplies data to the private branch exchange in response to the radio signal received from the radio card and a second part automatically detects a position of the user carrying the radio card based on the data received from the first part via the private branch exchange by associating the user with the telephone set to which the first part is coupled.

26 Claims, 6 Drawing Sheets

AUTOMATIC POSITION MANAGING SYSTEM

BACKGROUND OF THE INVENTION

The present invention generally relates to automatic position managing systems, and more particularly to an automatic position managing system which automatically detects and holds the in-plant position of a person carrying a radio card so that a telephone call to this person can be transferred to a telephone set located in the vicinity of the person, for example.

People frequently move within company premises, and systems have been proposed to detect and recognize the new position of the person, so that a telephone call to this person can be transferred to the new position, this person can be called at the new position and the like.

These proposed systems have the function of detecting the movement of each person, and the new position of each person is recognized. However, various complicated operations are required to detect and recognize the position, and there are cases where specific in-plant positions cannot be recognized. Accordingly, there are demands to simplify the method of recognizing the movement of each person.

According to one conventional system, a magnetic card reader is built into the telephone set itself. In this case, the holder of the magnetic card registers his new (or present) position by passing the magnetic card through the magnetic card reader, so that the system is aware of this new position. Alternately, there is a conventional system which registers the new position of the person by making a ten-key input from the telephone set which is located in the vicinity of this new position. According to these conventional systems, the person must cancel the registration by use of the magnetic card or the ten-key when leaving his seat to move to a new in-plant position.

Therefore, the conventional systems require the person to make some kind of operation to cancel the previously made position registration and/or to register his new in-plant position every time he moves within the company premises. As a result, there were problems in that the person may make an error when making the registration or the cancellation, and that the person may completely forget to perform the necessary operation. In addition, the quality of the service provided by the conventional system was poor because of the complicated operations required by each person moving within the company premises.

SUMMARY OF THE INVENTION

Accordingly, it is a general object of the present invention to provide a novel and useful automatic position managing system in which the problems described above are eliminated.

Another and more specific object of the present invention is to provide an automatic position managing system for a communication system which includes a plurality of telephone sets coupled to a private branch exchange, comprising a radio card which is carried by a user, where the radio card includes means for storing information related to the user and means for transmitting the stored information by a radio signal, first means, coupled to the telephone set, for supplying data to the private branch exchange in response to the radio signal received from the radio card, and second means, coupled to the private branch exchange, for automatically detecting a position of the user carrying the radio card based on the data received from the first means via the private branch exchange by associating the user with the telephone set to which the first means is coupled. According to the automatic position managing system of the present invention, it is possible to automatically recognize the position of the user carrying the radio card. Hence, it is possible to automatically transfer a call to the user based on the recognized position.

Other objects and further features of the present invention will be apparent from the following detailed description when read in conjunction with the accompanying drawings.

DESCRIPTION OF THE PREFERRED EMBODIMENTS

First, a description will be given of the operating principle of the present invention, by referring to FIG. 1.

Figure 1:
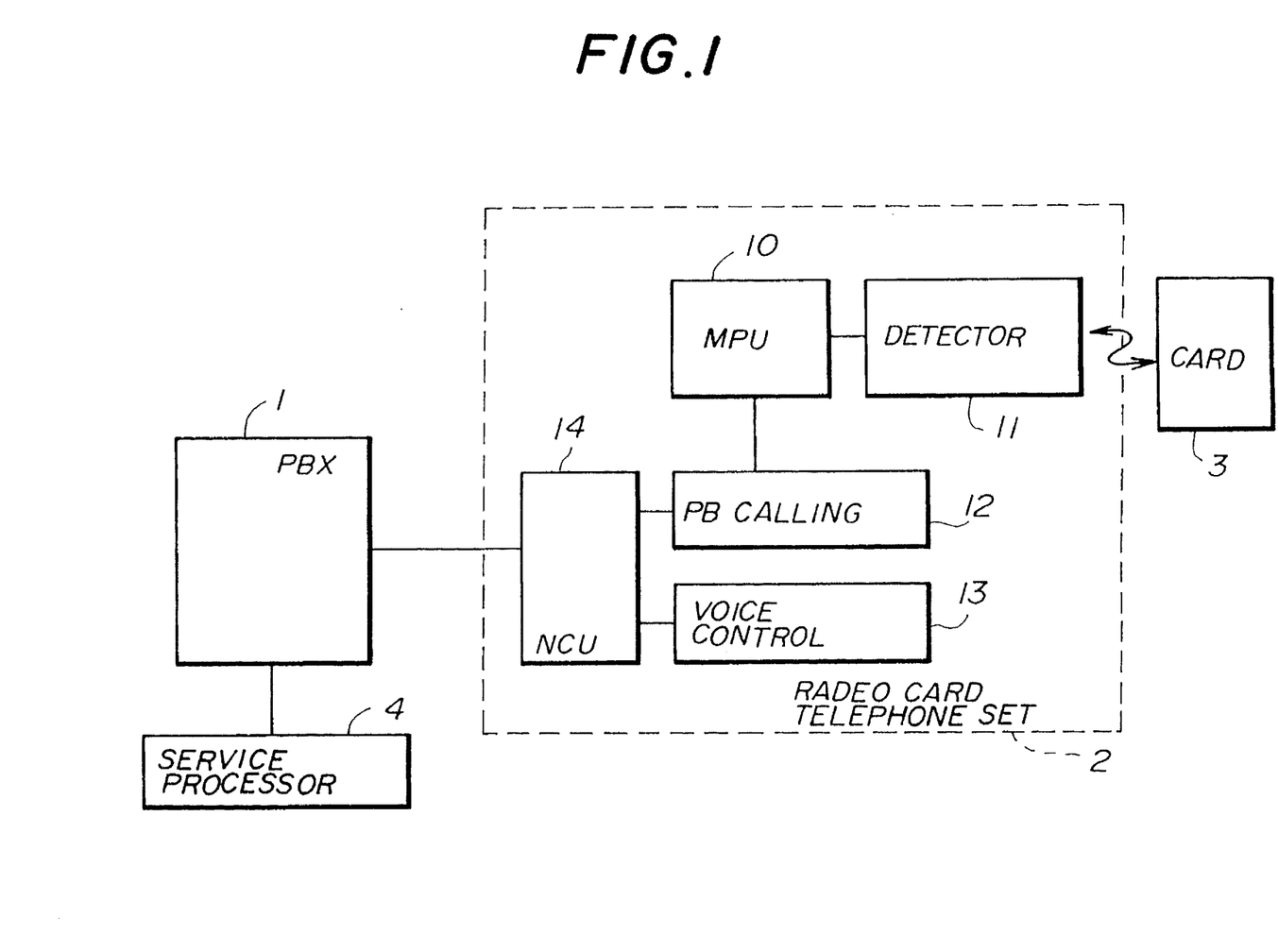
FIG. 1 is a system block diagram for explaining the operating principle of the present invention.

In FIG. 1, a radio card telephone set 2 is connected to a private branch exchange (PBX) 1 which switches lines with respect to a plurality of telephone sets (not shown). A person whose in-plant position is to be registered carries a radio card 3. A communication service processor 4 is connected to the PBX 1 to carry out additional services other than the line switching by the PBX 1, such as a call transfer service.

The radio card telephone set 2 includes a microprocessor unit (MPU) 10, a radio card detector 11, a PB calling part 12, a voice control part 13, and a network control unit (NCU) 14. The radio card 3 stores fixed data such as an identification number of the person carrying this radio card 3.

A radio wave for enabling radio card detection is transmitted from the radio card detector 11. When the radio card 3 receives this radio wave, a radio wave which includes the fixed data such as the identification number of the card holder is transmitted from the radio card 3. The radio wave from the radio card 3 is received by the radio card detector 11, and the fixed data such as the identification number is transferred to the MPU 10.

The MPU 10 extracts the identification number from the data received from the radio card detector 11, and transfers the identification number to the PB calling part 12. The PB calling part 12 transfers this identification number to the PBX 1 via the NCU 14 together with the telephone number (PB number) of the radio card telephone set 2. The PBX 1 decodes the identification number at the communication service processor 4, and registers a PB number with respect to this identification number.

Accordingly, the card holder is automatically registered at the PB number in a vicinity of the present position of the card holder, and there is no need to manually register the new position even if the card holder leaves his seat. For this reason, it is possible to automatically detect the present position of the card holder, and to automatically and accurately carry out services such as the call transfer service and the management of the seated persons based on the position information.

Of course, the radio card detector 11 may be considered as a part of the MPU 10. In addition, the radio wave for enabling the radio card detection in the radio card detector 11 may be transmitted from the radio card 3. But to minimize the power consumption of the radio card 3, it is desirable to transmit the radio wave for enabling the radio card detection from the radio card detector 11 rather than from the radio card 3.

Figure 2:
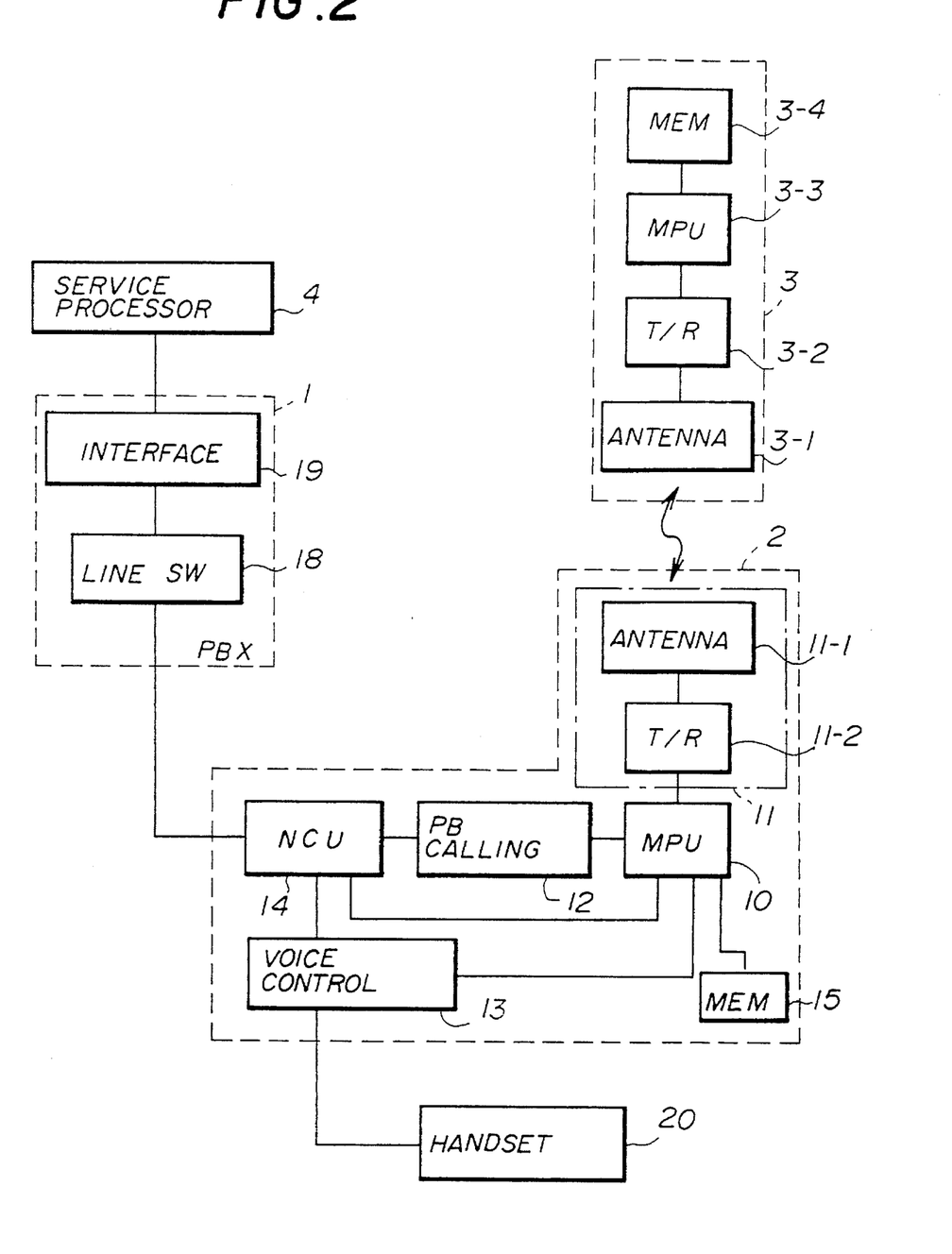
FIG. 2 is a system block diagram showing a first embodiment of an automatic position managing system according to the present invention.
Figure 3:
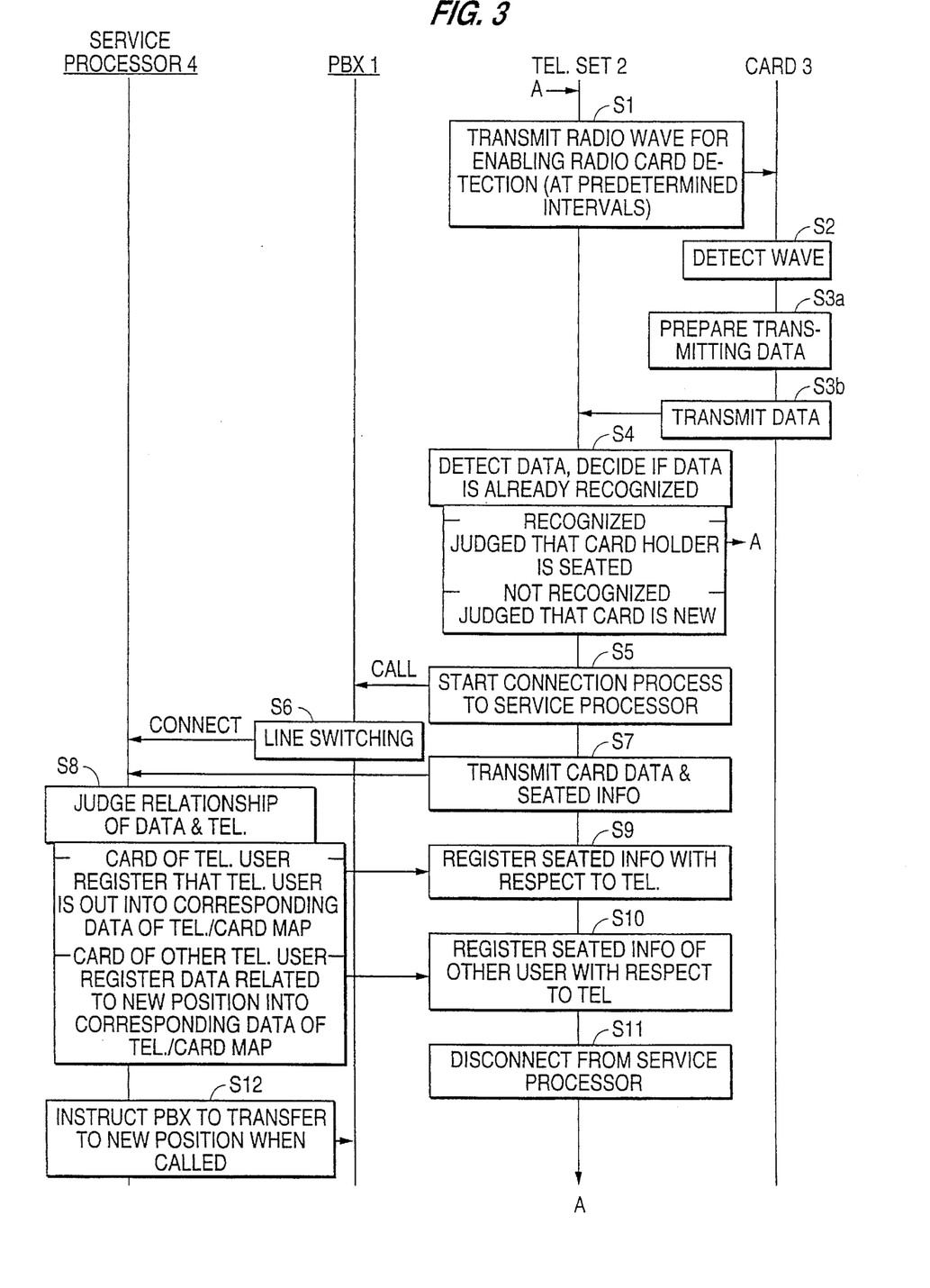
FIG. 3 is a diagram for explaining the operation of the first embodiment when a card holder takes his seat.
Figure 4:
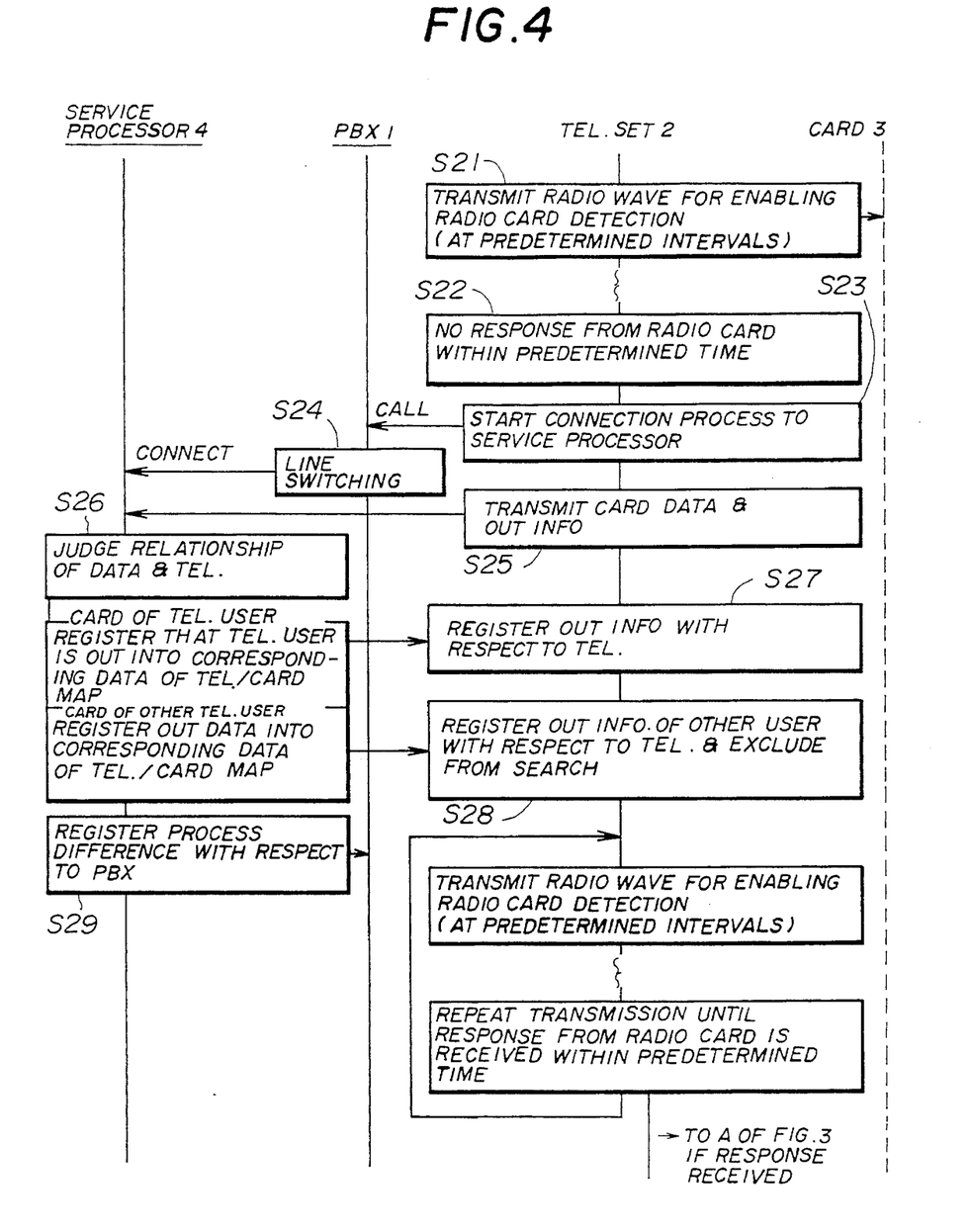
FIG. 4 is a diagram for explaining the operation of the first embodiment when the card holder leaves his seat.

Next, a description will be given of a first embodiment of an automatic position managing system according to the present invention, by referring to FIGS. 2 through 4. FIG. 2 generally shows the first embodiment. FIG. 3 is a diagram for explaining the operation of the first embodiment when the card holder takes his seat, and FIG. 4 is a diagram for explaining the operation of the first embodiment when the card holder leaves his seat. In FIGS. 2 through 4, those parts which are the same as those corresponding parts in FIG. 1 are designated by the same reference numerals, and a description thereof will be omitted.

The PBX 1 includes a line switching part 18 and a service equipment interface 19. The PBX 1 switches the lines with respect to a plurality of in-plant telephone sets (not shown), and connects to a local line.

The radio card telephone set 2 is provided with the radio card detector 11 which is made up of an antenna 11-1 and a transmitter/receiver 11-2. The PB calling part 12 transmits the PB (push-botton) signal with respect to the line, and generates a PB signal which indicates the radio card telephone set 2 to which the PB calling part 12 belongs in addition to the PB signal which corresponds to the input made by the user. The radio card telephone set 2 includes the voice control part 13 similarly to the normal telephone set. This voice control part 13 transmits and receives a voice signal to and from a handset 20. The NCU 14 also carries out a control which determines whether the PB signal is to be transmitted with respect to the line or the voice signal is to be transmitted and received. A memory 15 is connected to the MPU 10 for storing information related to the card holder who will use the automatic card telephone set 2. For example, an employee number is registered in the memory 15.

The radio card 3 includes an antenna 3-1, a transmitter/receiver 3-2, an MPU 3-3, and a memory 3-4. The MPU 3-3 controls the response with respect to the radio card telephone set 2. The memory 3-4 stores data which enables identification of each card holder (user). For example, numerical information such as the employee number, telephone number and a special identification (ID) number is stored in the memory 3-4.

When the MPU 3-3 supplies the data from the memory 3-4 to the transmitter/receiver 3-2, the transmitter/receiver 3-2 modulates the data and a modulated ratio signal is transmitted via the antenna 3-1.

The modulated radio signal is received by the antenna 11-1 of the radio telephone set 2, and is demodulated back into the original data in the transmitter/receiver 11-2. The demodulated data is supplied to the MPU 10. The MPU 10 detects from the demodulated data that the card holder is in the vicinity of the radio card telephone set 2, and decodes the employee number so as to detect whether or not this employee number is already registered with respect to this radio card telephone set 2. If the decoded employee number and the employee number which is already registered with respect to this radio card telephone set 2 match, the MPU 10 notifies the communication service processor 4 accordingly, as will be described later.

Alternately, if the decoded employee number and the employee number which is already registered with respect to this radio card telephone set 2 do not match, the MPU 10 recognizes that it is necessary that the existence of the card holder be notified to the communication service processor 4 via the PBX 1, and carries out the process which will be described in the following after registering this card holder in the memory 15 of the radio card telephone set 2. In addition, the MPU 10 controls the NCU 14 to make a connection request with respect to the PBX 1 by the PB signal.

The PBX 1 recognizes from the signal which is received from the radio card telephone set 2 that there is an update of the radio card data, and connects the line to the communication service processor 4. When the communication service processor 4 and the radio card telephone set 2 are connected via the line, the data from the radio card 3 is transmitted from the radio card telephone set 2 by the PB signal. The communication service processor 4 receives this PB signal and confirms the telephone set which is located near the card holder, and adds or corrects the data related to this card holder.

The communication service processor 4 recognizes the telephone set which is located near the present position of the card holder in the above described manner, so that a call to the card holder can be transferred automatically to the telephone set which is located near the card holder. In addition, the communication service processor 4 can also provide other services such as providing information related to the seated card holders based on the present position data of the card holders.

Next, a description will be given of the operation of this embodiment, by referring to FIGS. 3 and 4.

First, a description will be given of the operation of this embodiment when the card holder takes a seat at the radio card telephone set, by referring to FIG. 3.

In this case, the MPU 10 of the radio card telephone set 2 transmits, at predetermined time intervals, the radio wave for enabling the radio card detection from the transmitter/receiver 11-2 via the antenna 11-1 in a step S1. When the transmitter/receiver 3-2 of the radio card 3 receives this radio wave, the MPU 3-3 is notified by the transmitter/receiver 3-2 and detects the radio wave in a step S2. The MPU 3-2 prepares the data to be transmitted to the radio card telephone set 2 in a step S3a by reading out the data related to the employee number of the card holder, the telephone number and the like from the memory 3-4. The MPU 3-3 transmits the read out data to the radio card telephone set 2 from the transmitter/receiver 3-2 via the antenna 3-1 in a step S3b. The transmitter/receiver 3-2 modulates the data prior to the transmission.

The modulated data from the radio card 3 is received by the transmitter/receiver 11-2 of the radio card telephone set 2 via the antenna 11-1, and is demodulated therein. The MPU 10 decodes the demodulated data which is received from the transmitter/receiver 11-2 in a step S4, and extracts the employee number, for example. The step S4 also collates the extracted employee number and the employee number which is already registered in the radio card telephone set 2 to which the MPU 10 belongs, so as to decide whether or not the received data is already recognized by the radio card telephone set. If the decision result is YES, it is judged that the card holder is seated at the radio card telephone set 2. On the other hand, if the decision result is NO, it is judged that the card holder is a new non-registered card holder.

The MPU 10 controls the NCU 14 and makes a connection request with respect to the PBX 1 by the PB signal in a step S5. That is, the connection request signal is output from the PB calling part 12 to the PBX 1, so as to make a call out with respect to the PBX 1.

The PBX 1 connects the line to the radio card telephone set 2 and the communication service processor 4 in a step S6. On the other hand, in the radio card telephone set 2, the MPU 10 notifies the communication service processor 4 of the card data such as employee number of the card holder, the telephone number and the like and the seated information, that is, the telephone number of the radio card telephone set 2, in a step S7.

In response to the notification from the radio card telephone set 2, the communication service processor 4 judges the relationship between the card data and the radio card telephone set 2 in a step S8. If the card data is related to the card holder using the radio card telephone set 2, information indicating that the telephone user is seated is registered in a corresponding part of a telephone/card map, i.e., management data, within the communication service processor 4. In addition, the seated information is registered in the radio card telephone set 2 in a step S9.

On the other hand, if the card data is related to the user of another radio card telephone set, information indicating the new (present) position of the previous user of the radio card telephone set 2 is registered in a corresponding part of the telephone/card map, i.e., management data, within the communication service processor 4. In addition, the user of the other radio card telephone set is registered in the radio card telephone set 2 as the seated information in a step S10. Thereafter, the connection between the radio card telephone set 2 and the communication service processor 4 is disconnected in a step S11.

The seated information related to the present user of the radio card telephone set 2 or the information related to the new (present) position of the previous user of the radio card telephone set 2 is registered in the communication service processor 4 as described above. Accordingly, if the radio card telephone set 2 is called, the PBX 1 notifies the communication service processor 4 of this call. Hence, the communication service processor 4 instructs the PBX 1 to transfer the received call to the new (present) position of the called card holder in a step S12 if this card holder is no longer seated at the radio card telephone set 2. As a result, it is possible to provide the service of automatically transferring the call to the called card holder.

Next, a description will be given of the operation of this embodiment when the card holder leaves a seat at the radio card telephone set, by referring to FIG. 4.

In this case, the MPU 10 of the radio card telephone set 2 transmits at predetermined time intervals, the radio wave for enabling the radio card detection from the transmitter/receiver 11-2 via the antenna 11-1 in a step S21. If no response is received from the radio card 3 within a predetermined time, the MPU 10 judges in a step S22, that the card holder has left the seat at the radio card telephone set 2.

The MPU 10 controls the NCU 1 and makes a connection request to the PBX 1 by the PB signal in a step S23. In other words, the connection request signal is output from the PB calling part 12 to the PBX 1 to make a call out with respect to the PBX 1. In response to this call out, the PBX 1 connects the line to the radio card telephone set 2 and the communication service processor 4 in a step S24. In addition, the MPU notifies the communication service processor 4 of the card data such as the employee number of the card holder and the telephone number and the out information, or more specifically, the telephone number of the radio card telephone set 2, in a step S25.

In response to the notification from the radio card telephone set 2, the communication service processor 4 judges the relationship between the card data and the radio card telephone set 2 in a step S26. If the card data is related to the card holder using the radio card telephone set 2, information indicating that the telephone user is out (that is, left his seat) is registered in a corresponding part of the telephone/card map within the communication service processor 4. In addition, the out information is registered in the radio card telephone set 2 in a step S27.

On the other hand, if the card data is related to the user of another radio card telephone set, information indicating the new (present) position of this user is registered in a corresponding part of the telephone/card map within the communication service processor 4. In addition, the user of the other radio card telephone set is registered in the radio card telephone set 2 as the out information in a step S28, so as to exclude this user when making the search.

Because the communication service processor 4 registers the out information, the PBX 1 notifies the communication service processor 4 if the radio card telephone set 2 is called. Accordingly, if the called card holder has left his seat and is out, the communication service processor 4 notifies the PBX 1 of this information in a step S29.

Each card holder who leaves his seat will take a seat at a new position. Hence, because the radio card telephone set at this new position is periodically transmitting the radio wave for the radio card detection, it is possible to detect the new position of the card holder based on the response received from the radio card. In other words, if a response is received from the radio card, the registration process for the case where the card holder takes a seat is carried out as indicated by the routine A of FIG. 3 described above.

Figure 5:
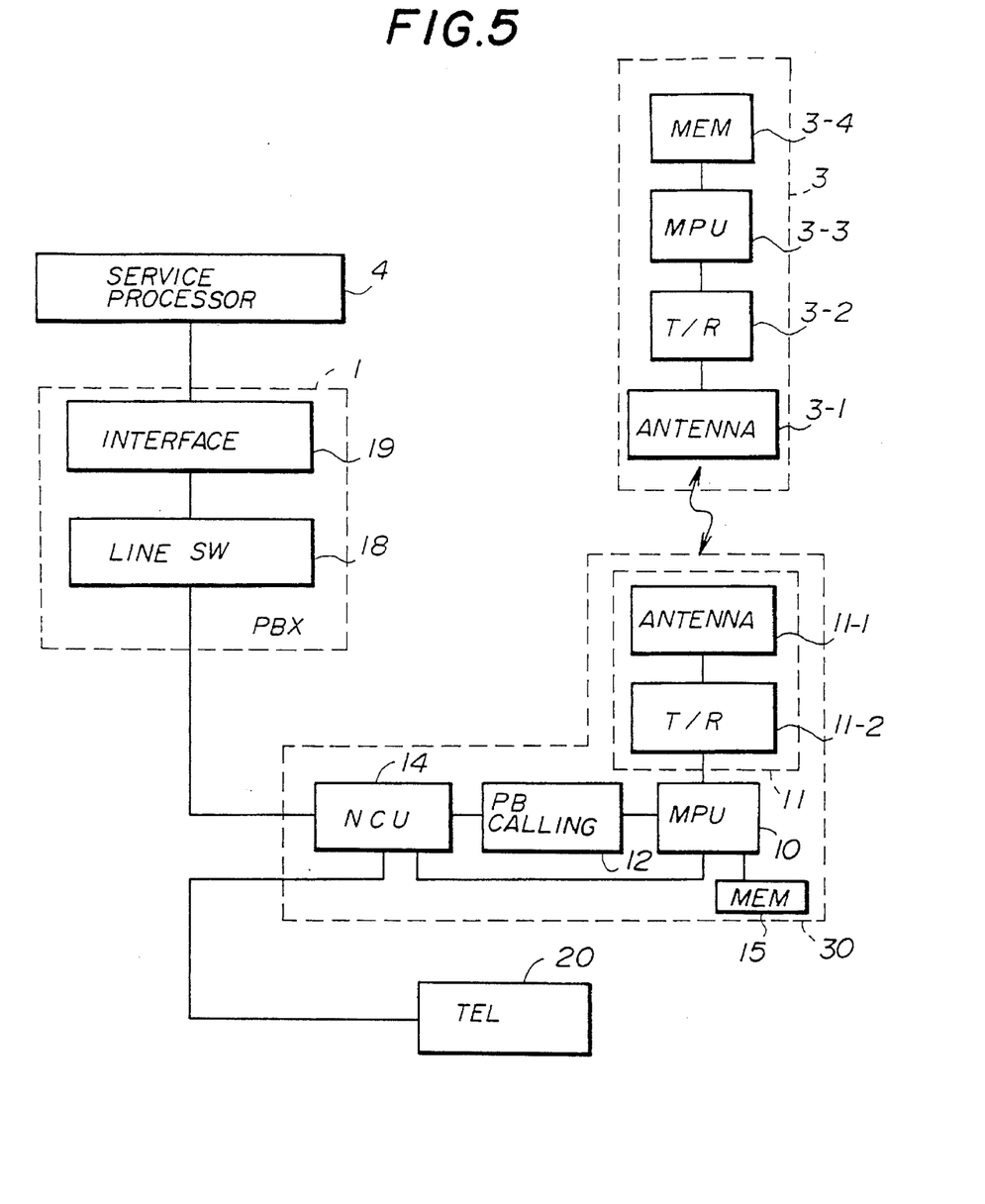
FIG. 5 is a system block diagram showing a second embodiment of the automatic position managing system according to the present invention.

Next, a description will be given of a second embodiment of the automatic position managing system according to the present invention, by referring to FIG. 5. In FIG. 5, those parts which are the same as those corresponding parts in FIG. 2 are designated by the same reference numerals, and a description thereof will be omitted.

In this embodiment, the present invention is applied to the existing telephone set. In other words, a radio card adapter 30 is connected to a normal telephone set 20. The radio card adapter 30 has a construction which is basically the same as that of the radio card telephone set 2 excluding the voice control part 13. The functions of the voice control part 13 are provided in the normal telephone set 20. The operation of this embodiment is the same as that of the first embodiment described above. According to this second embodiment, it is possible to make use of the existing telephone sets without the need to replace the existing telephone sets by the radio card telephone sets.

Figure 6:
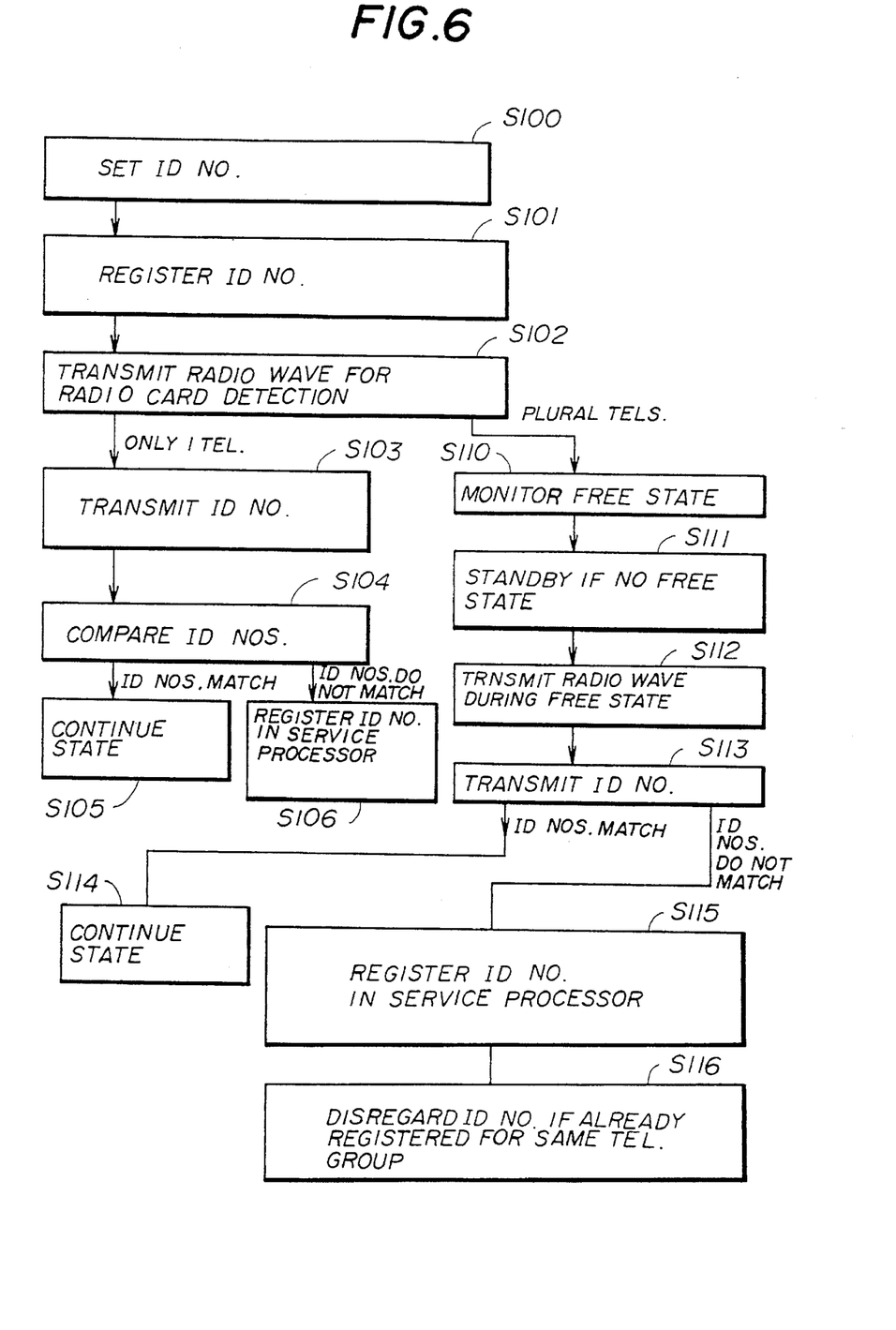
FIG. 6 is a flow chart for explaining the operation of the present invention for a case where a plurality of radio card telephone sets are provided in a vicinity of the radio card in comparison with a case where one radio card telephone is provided in the vicinity of the radio card.

Next, a description will be given of art application of the present invention where a plurality of radio card telephone sets are provided in a vicinity of the card holder. FIG. 6 is a flow chart for explaining the operation of the present invention for the case where a plurality of radio card telephone sets are provided in the vicinity of the radio card in comparison with a case where one radio card telephone is provided in the vicinity of the radio card.

First, an initial setting is made in steps S100 through S102 shown in FIG. 6. In the step S100, a card holder sets his ID number into the radio telephone set 2 which he intends to use at ordinary times. In the step S101, the MPU 10 stores the set ID number in the memory 15, and connects to the PBX 1 so as to register this ID number in the communication service processor 4. Hence, this ID number is associated with the telephone number of the radio card telephone set 2 and registered in the communication service processor 4. Then, the MPU 10 makes a polling with respect to the radio card 3 by periodically transmitting the radio wave for enabling the radio card detection via the transmitter/receiver 11-2 and the antenna 11-1.

Steps S103 through 106 carry out the process described above if only one radio card telephone set 2 is provided in the vicinity of the radio card 3. In other words, in the step S103, the radio card 3 responds to the radio wave received from the radio card telephone set 2 by sending back the ID number of the card holder. In the step 104, the MPU 10 of the radio card telephone set 2 compares the received ID number with the ID number set in the memory 15. If the two compared ID numbers match, the MPU 10 recognizes in the step S105, that the card holder of this radio card 3 is already set as the user of this radio card telephone set 2, and this state is continued. On the other hand, if the two compared ID numbers do not match, the MPU 10 recognizes in the step S106, that the card holder is not yet set as the user of this radio card telephone set 2, and registers the ID number received from the radio card 3 into the communication service processor 4 via the PBX 1.

On the other hand, a plurality of radio card telephone sets 2 may be provided in the vicinity of the radio card 3. In this case, steps S110 through S116 are carried out.

In the step S110, the MPU 10 of each radio card telephone set 2 monitors the free state in which the radio card telephone set 2 can transmit the radio 1 wave for enabling the radio card detection. If no free state is detected in the step S110, the MPU 10 uses an internal timer to wait, i.e., assume a standby state, for a predetermined time. If the free state is detected, the MPU 10 controls the transmitter/receiver 11-2 in the step S112 so as to transmit the radio wave for enabling the radio card detection during this free state. The radio card 3 responds to the radio wave received from the radio card telephone set 2 by sending back the ID number of the card holder in the step S113. In the step 114, the MPU 10 of the radio card telephone set 2 compares the received ID number with the ID number set in the memory 15, and if the two compared ID numbers match, the MPU 10 recognizes that the card holder of this radio card 3 is already set as the user of this radio card telephone set 2, and this state is continued. On the other hand, if the two compared ID numbers do not match, the MPU 10 recognizes in the step S115 that the card holder is not yet set as the user of this radio card telephone set 2, and registers the ID number received from the radio card 3 into the communication service processor 4 via the PBX 1.

In order to prevent unnecessary updating of the data stored in the communication service processor 4 in response to each response of the radio card 3 received by the plurality of radio card telephone sets 2, the following measures may be taken. More specifically, the plurality of radio card telephone sets 2 which are located close to each other are grouped, and registered in the communication service processor 4 as a telephone group by an initial setting. In this case, the communication service processor 4 in the step S116 can disregard the registration of the new ID number requested from one radio card telephone set 2 within a certain telephone group if the same ID number is already associated with the telephone number of another radio card telephone set 2 within this certain telephone group and registered in the communication service processor 4. As a result, the frequent and unnecessary updating of the registered data in the communication service processor 4 can be prevented even if the card holder happens to be seated at a position where the plurality of radio card telephone sets 2 are provided close to each other.

Further, the present invention is not limited to these embodiments, but various variations and modifications may be made without departing from the scope of the present invention.

What is claimed is:

1. An automatic position managing system for a communication system which includes a plurality of telephone sets coupled to a private branch exchange, said automatic position managing system comprising:

a radio card which is carried by a user having a corresponding seating place, said radio card including means for storing information related to the user and means for transmitting the stored information by a radio signal;

first means, coupled to a telephone set of the plurality of telephone sets, for receiving the radio signal from said radio card and supplying data to the private branch exchange in response to the radio signal received from said radio card, wherein said first means calls said radio card at predetermined intervals, and said radio card transmits the radio signal in response to a call from said first means;

second means, coupled to the private branch exchange, for automatically detecting a position of the user carrying said radio card based on the data received from said first means via the private branch exchange, by associating the user with the telephone set to which said first means is coupled, for storing management data and for determining the relationship between said radio card and the telephone set such that if said radio card belongs to the user of the telephone set, the radio card is registered in the management data indicating the user is at the corresponding seating place and if the radio card does not belong to the user of the telephone set, present location data related to a present seating place of the user is registered in the management data; and third means for calling, when a call is received, the telephone set located at the corresponding seating place of the user when the user is seated at the corresponding seating place and for directly calling a selected telephone set of the plurality of telephone seats based on the location of the user, when the user is not at the corresponding seating place.

2. The automatic position managing system as claimed in claim 1, wherein said second means includes means for storing the information related to the user as stored user information and position data related to the position of the user based on the data received from said first means as stored position data.

3. The automatic position managing system as claimed in claim 2, wherein said second means automatically transfers a call received by the private branch exchange based on the stored position data.

4. The automatic position managing system as claimed in claim 1, wherein said second means is a communication service processor, which further enables additional communication services including a call transfer service other than line switching by the private branch exchange.

5. The automatic position managing system as claimed in claim 1, wherein said first means supplies to the private branch exchange, as the data, at least a part of the stored information of the radio signal received from said radio card and a telephone number of the telephone set to which said first means is coupled.

6. The automatic position managing system as claimed in claim 1, wherein the information stored in and transmitted by said radio card includes an identification number specific to the user carrying said radio card, the automatic position managing system further comprising fourth means, coupled to said first means, for storing registered identification numbers of registered users of the telephone set.

7. The automatic position managing system as claimed in claim 6, wherein said first means supplies, to the private branch exchange, update data if the identification number included in the stored information received from said radio card is different from all of the registered identification numbers stored in said fourth means.

8. The automatic position managing system as claimed in claim 7, wherein said second means includes means for storing the identification number of the user based on the data received from said first means by associating the identification number with position data of the telephone set to which said first means is coupled, and means for updating the position data based on the update data received from said first means.

9. The automatic position managing system as claimed in claim 8, wherein said second means further includes means for storing group information related to a plurality of telephone sets which are grouped, and means for disregarding the update data received from said first means, which is coupled to a first telephone set within a certain group, if the identification number received from the radio card is already associated with the position data of a stored telephone set within said certain group and stored in said second means, where said first and second telephone sets are different telephone sets.

10. The automatic position managing system as claimed in claim 1, wherein said first means supplies update data to the private branch exchange if a radio signal from said radio card is not detected within a predetermined time, and said second means includes means for updating position data related to the position of the user based on the update data received from said first means.

11. The automatic position managing system as claimed in claim 1, wherein said radio card transmits the radio signal to said first means at predetermined intervals.

12. The automatic position managing system as claimed in claim 1, wherein the telephone set and said first means form a radio card telephone set which is designed exclusively for interactive operation with said radio card.

13. The automatic position managing system as claimed in claim 1, wherein said first means is an adapter coupled to the telephone set.

14. An automatic position managing system for a communication system which includes a plurality of telephone sets coupled to a private branch exchange, which stores information related to a user and transmits the stored information by a corresponding radio signal and in which the user has a corresponding seating place, said automatic position managing system comprising:

first means, coupled to a telephone set of the plurality of telephone sets, for receiving a radio signal which transmits stored information relative to a corresponding user and supplying data to the private branch exchange in response to the radio signal received, wherein said first means calls the user at predetermined intervals and the corresponding radio signal is transmitted in response to a call from said first means;

second means, coupled to the private branch exchange, for automatically detecting a position of the user based on the data received from said first means via the private branch exchange, by associating the user with the telephone set to which said first means is coupled, for storing management data and for determining the relationship between the user and the telephone set such that if the telephone set belongs to the user of the telephone set, the telephone set is registered in the management data indicating the user is at the corresponding seating place and if the radio card does not belong to the user of the telephone set, present location data related to a present seating place of the user is registered in the management data; and third means for calling, when a call is received, the telephone set located at the corresponding seating place of the user when the user is seated at the corresponding seating place and for directly calling a selected telephone set of the plurality of telephone seats based on the location of the user, when the user is not at the corresponding seating place.

15. The automatic position managing system as claimed in claim 14, wherein said second means includes means for storing the information related to the user as stored user information and position data related to the position of the user based on the data received from said first means as stored position data.

16. The automatic position managing system as claimed in claim 15, wherein said second means automatically transfers a call received by the private branch exchange based on the stored position data.

17. The automatic position managing system as claimed in claim 14, wherein said second means is a communication service processor which further enables additional communication services including a call transfer service other than line switching by the private branch exchange.

18. The automatic position managing system as claimed in claim 14, wherein said first means supplies to the private branch exchange, as the data, at least a part of the stored information transmitted by the radio signal and a telephone number of the telephone set to which said first means is coupled.

19. The automatic position managing system as claimed in claim 14, wherein:

the information stored in and transmitted by the radio signal includes an identification number specific to the corresponding user, and the automatic position managing system further comprises fourth means, coupled to said first means, for storing registered identification numbers of registered users of the telephone set.

20. The automatic position managing system as claimed in claim 19, wherein said first means supplies update data to the private branch exchange, if the identification number included in the stored information received from the radio signal is different from all of the registered identification numbers stored in said fourth means.

21. The automatic position managing system as claimed in claim 20, wherein said second means further comprises:

means for storing the identification number of the user based on the data received from said first means by associating the identification number with position data of the telephone set to which said first means is coupled, and means for updating the position data based on the update data received from said first means.

22. The automatic position managing system as claimed in claim 21, wherein said second means further comprises:

means for storing group information related to a plurality of telephone sets which are grouped, and means for disregarding the update data received from said first means, which is coupled to a first telephone set within a certain group, if the identification number received from the radio signal is already associated with the position data of a second telephone set within said certain group and stored in said second means, where said first and second telephone sets are different telephone sets.

23. The automatic position managing system as claimed in claim 14, wherein said first means supplies update data to the private branch exchange if a radio signal is not detected within a predetermined time, and said second means includes means for updating position data related to the position of the user based on the update data received from said first means.

24. The automatic position managing system as claimed in claim 14, wherein the radio signal is transmitted to said first means at predetermined intervals.

25. The automatic position managing system as claimed in claim 14, wherein the telephone set and said first means form a radio card telephone set which is designed exclusively for interactive operation with the radio signal.

26. The automatic position managing system as claimed in claim 14, wherein said first means is an adapter coupled to the telephone set.

* * * * *

UNITED STATES PATENT AND TRADEMARK OFFICE
CERTIFICATE OF CORRECTION

PATENT NO. : 5,533,113
DATED : July 2, 1996
INVENTOR(S) : OZAWA et al.

It is certified that error appears in the above-indentified patent and that said Letters Patent is hereby corrected as shown below:

Col. 7, line 42, change "radio 1 wave" to --radio wave--.

Signed and Sealed this

Twenty-sixth Day of November 1996

Attest:

BRUCE LEHMAN

Attesting Officer    Commissioner of Patents and Trademarks